US010638678B2

(12) United States Patent
Collier et al.

(10) Patent No.: US 10,638,678 B2
(45) Date of Patent: May 5, 2020

(54) VERTICAL TIERED GROWING SYSTEMS

(71) Applicant: TEAM GREEN LIMITED, Hong Kong (CN)

(72) Inventors: Ian Collier, Coventry (GB); Iain Reynolds, Coventry (GB)

(73) Assignee: TEAM GREEN LIMITED, Hong Kong (CN)

( * ) Notice: Subject to any disclaimer, the term of this patent is extended or adjusted under 35 U.S.C. 154(b) by 391 days.

(21) Appl. No.: 15/112,839

(22) PCT Filed: Mar. 23, 2015

(86) PCT No.: PCT/GB2015/000098
§ 371 (c)(1),
(2) Date: Jul. 20, 2016

(87) PCT Pub. No.: WO2015/140493
PCT Pub. Date: Sep. 24, 2015

(65) Prior Publication Data
US 2016/0345518 A1  Dec. 1, 2016

(30) Foreign Application Priority Data

Mar. 21, 2014 (GB) .................................. 1405099.1

(51) Int. Cl.
| | |
|---|---|
| *A01G 31/06* | (2006.01) |
| *A01G 9/14* | (2006.01) |
| *A01G 9/02* | (2018.01) |
| *A01G 7/04* | (2006.01) |
| *A01G 9/20* | (2006.01) |
| *A01G 31/00* | (2018.01) |

(52) U.S. Cl.
CPC ............. *A01G 31/06* (2013.01); *A01G 7/045* (2013.01); *A01G 9/023* (2013.01); *A01G 9/143* (2013.01); *A01G 9/20* (2013.01); *A01G 2031/006* (2013.01); *Y02A 40/252* (2018.01); *Y02P 60/216* (2015.11)

(58) Field of Classification Search
CPC .... A01G 31/001; A01G 31/04; A01G 31/042; A01G 31/06; A01G 7/045; A01G 9/023; A01G 9/143; A01G 9/20; A01G 9/1066; A01G 9/1423; A01G 9/14; A01G 1/001; A01G 31/02; A01G 31/045
See application file for complete search history.

(56) References Cited

U.S. PATENT DOCUMENTS

| | | | | |
|---|---|---|---|---|
| 2,917,867 A | * | 12/1959 | Bailey .................... | A01G 31/06 47/16 |
| 3,717,953 A | * | 2/1973 | Kuhn ...................... | A01G 18/60 47/1.1 |
| 4,163,342 A | * | 8/1979 | Fogg ....................... | A01G 7/045 47/58.1 R |

(Continued)

FOREIGN PATENT DOCUMENTS

WO  WO-2013113096 A1 * 8/2013 ............. A01G 22/00

*Primary Examiner* — Trinh T Nguyen
(74) *Attorney, Agent, or Firm* — Aeon Law, PLLC; Adam L. K. Philipp; David V. H. Cohen (57) ABSTRACT

A vertical tier growing system for growing plants (8). The system includes at least one vertically tiered shelf section (1) secured to and movable along a floor track. Each section (1) has its own means to direct nutrient fluid and light to plants (8) growing on said section (1).

17 Claims, 13 Drawing Sheets

(56) References Cited

U.S. PATENT DOCUMENTS

| | | | | |
|---|---|---|---|---|
| 4,324,069 A * | 4/1982 | Flagg | ............... | A01G 27/001 47/62 E |
| 4,630,394 A * | 12/1986 | Sherard | ............... | A01G 31/02 47/18 |
| 5,675,932 A * | 10/1997 | Mauney | ............... | A01G 31/02 47/17 |
| 8,627,598 B1 * | 1/2014 | Souder | ............... | A01G 31/042 47/1.01 R |
| 9,560,813 B2 * | 2/2017 | Hassle | ............... | A01G 9/14 |
| 2012/0054061 A1 * | 3/2012 | Fok | ............... | A01G 31/00 705/26.5 |
| 2013/0104453 A1 * | 5/2013 | Hassle | ............... | A01G 9/14 47/17 |
| 2014/0017043 A1 * | 1/2014 | Hirai | ............... | A01G 31/02 414/267 |
| 2015/0107154 A1 * | 4/2015 | Visser | ............... | A01G 9/143 47/66.6 |
| 2015/0282437 A1 * | 10/2015 | Ohara | ............... | A01G 7/00 47/66.6 |
| 2017/0339846 A1 * | 11/2017 | Lawrence | ............... | A01G 9/0297 |

\* cited by examiner

VERTICAL TIERED GROWING SYSTEMS

FIELD OF THE INVENTION

The present invention relates to vertical tiered growing systems for inter alia growing plants, micro herbs or edible foliage. More especially, the present invention relates to vertical tiered growing system that is modular in structure with individual tiered sections movable about a track assembly thereby to reduce the footprint of the system to allow it to be accommodated in areas where space is limited.

BACKGROUND TO THE INVENTION

The hydroponics industry is growing year on year. It is becoming increasingly common and indeed necessary for nations of the world to grow fresh produce locally to feed their populations.

A common method of growing plants involves an NFT (Nutrient Film Technique) system. An NFT system is a recirculating hydroponic system that consists of growing channels or trays over which a nutrient solution is constantly pumped across, creating a nutrient film into which the roots grow. Plants are often started in stonewool cubes and placed on the growing channels. The solution is recirculated from a main tank.

Large scale NFT systems require a considerable amount of land as plants are traditionally laid out in channels along a horizontal plane over a large area. In general, the greater the amount of produce required, the greater the area of the land needed to grow the produce.

Consequently, urban areas rely on fresh plants and edible produce to be delivered from the rural, often distant, farming areas. The expanse of farming area required means that fresh produce is generally not grown on a commercial scale within urban areas and cities. This is particularly the case in built-up cities around the world were open space is limited and at a premium.

Restaurants within cities and urban areas require daily deliveries of fresh produce. Supermarkets also require regular large deliveries requiring vast transport networks and logistics.

Vertical tier NFT systems are known which allow fresh produce to be grown in vertical tiers of shelving. Such systems however have been found to have inflexible structures and have restrictive limitations on the amount of tiers, and hence produce, that can be grown within a given area. Walkways must be provided between each shelf tier to allow access to any plant growing within the assembly. This can easily double the size of the footprint area needed for such systems.

Moreover, should the framework of known systems need to be moved, all lighting and fluid systems required for the system must be disconnected. Consequently, it is not possible to move or re-position any parts of the framework during any plant growing cycle.

The present invention seeks to provide an improved vertical growing system for growing inter alia plants, which has a flexible modular structure to alleviate the spacial limitations of current systems and which allows sections of tiered shelving structure to be moved and re-positioned during, and without interfering with, the growing cycle.

The term "growing system" is intended to include any system that provides water or other nutrient fluid and light to plants growing within the system. This includes NFT systems as well as flood and drain systems.

The term "plants" is intended to include edible leaves, such as lettuces and herbs.

SUMMARY OF THE INVENTION

According to a first aspect of the present invention there is provided a vertical tier growing system for inter alia plants, the system comprising at least one vertically tiered shelf section secured to and movable along a floor track, the or each section having located thereon means to provide and direct fluid and lighting to plants growing on said section during use.

The term "fluid" is intended to include any liquid used for aiding the growth of plants. It may, for example, be water or may be some other form of nutrient liquid.

Preferably the system comprises at least two tiered shelf sections movable about the track from first positions wherein the sections are adjacent to each other to a second positions wherein a walkway is provided therebetween.

Preferably the system includes or is otherwise linked to a centralised power and fluid sources connectable, in use, to each individual section through flexible links.

Preferably, the floor track is formed in a grid-like formation.

The or each section may comprise a framework and may have an array of elongate plant trays extending longitudinally through the framework.

Preferably, the or each section has artificial light tubing connected to the frame and extending above and along each plant tray.

Preferably, the or each section includes a pipe work connected to the framework to provide a channel through which fluid can flow between the pipe work and the plant trays.

The system may include a drainage tank located at one end of the or each section into the confines of which drainage pipe outlets extend.

Preferably, the drainage tank includes means to pump fluid from the drainage tank back into the pipe work of the section for recirculation through the plant trays.

Preferably still, the drainage tank has an elongated form to provide a single structure in which the outlets of drainage pipes of neighbouring sections extend.

Preferably, the or each section comprises a framework of interconnecting horizontal and vertical beams, and comprising longitudinal support arms extending horizontally through the framework on which one or more plant trays can be supported.

The support arms may include roller mechanism extending along the length thereof and along which the trays can be moved from one end of the section to the other.

Preferably, the or each section includes a drainage channel extending along one side thereof to receive and drain excess fluid from the plant trays.

BRIEF DESCRIPTION OF THE DRAWINGS

The invention will now be described by way of example only with reference to the accompanying diagrammatic drawings in which:—

FIGS. 9(A) and (B) are schematic illustrations of how the sections can be moved to form paths therebetween;

DETAILED DESCRIPTION OF THE INVENTION

Figure 1:
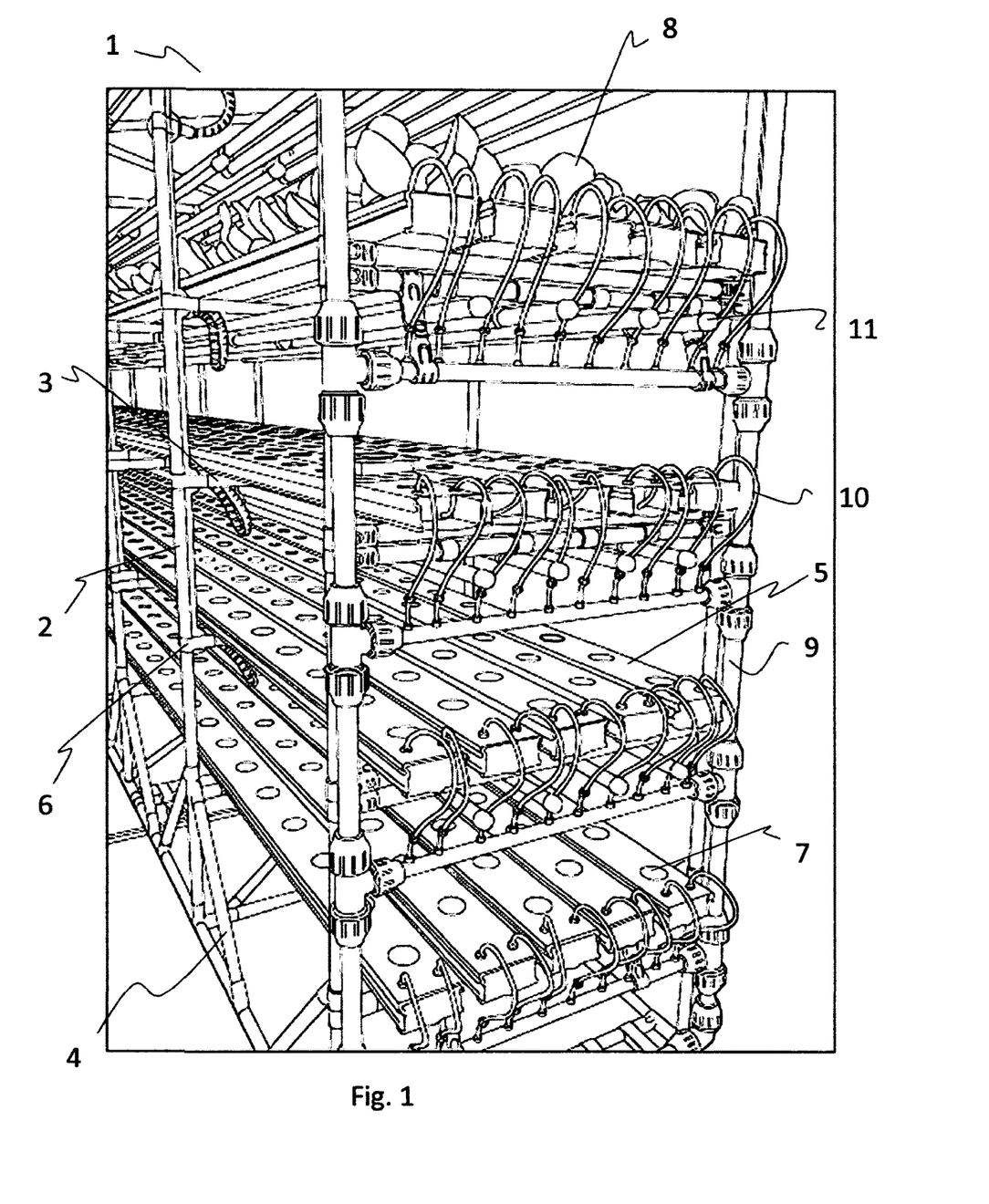
FIG. 1 is a perspective view of a vertical tiered section forming part of a vertical growing system constructed in accordance with a first embodiment of the present invention.

FIG. 1 illustrates a tiered section 1 of a vertical tiered growing system, in this case an NFT system. The overall system would include a plurality of such sections. The section 1 comprises a framework of interconnecting vertical and horizontal beams (2 and 3 respectively). Angled beams 4 are provided at the base to provide strength to the base of the framework.

A tiered array of elongate plant trays 5 extend longitudinally along the frame work resting across the horizontal beams 3.

The framework beams 2, 3 are constructed from aluminium or other suitable strong but lightweight material.

Figure 2:
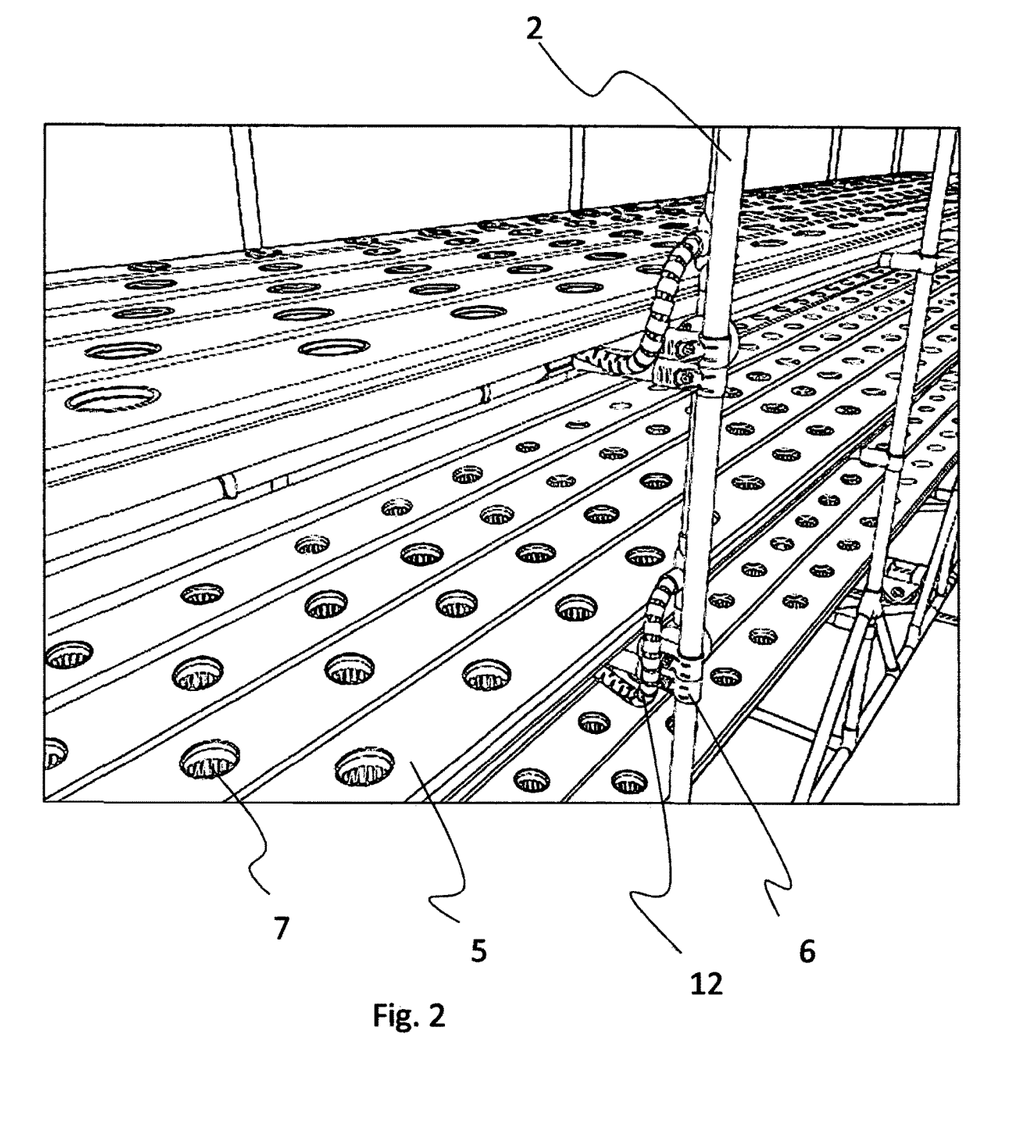
FIG. 2 is a close up view of part of tiered section of FIG. 1.

As can be seen in FIG. 2, the horizontal beams 3 are connected to the vertical beams 2 through jointed clamps 6, the height of which can be altered to lower or heighten any tier level within the section 1 without having to deconstruct the entire framework.

Each plant tray 5 is generally made from plastic and has a hollow rectangular form. Apertures 7 are provided uniformly along each tray 5 in which are received plant roots or seedlings which grow into plants such as, for example in the case illustrated in the top tier of FIG. 5, lettuce. In use, a flow of nutrient is directed into and along each tray 5.

One end of the section (shown in FIG. 1) has a secondary frame of pipe work 9. Tubing 10 links the end of each tray 5 with the pipe work 9 to provide a closed system through which nutrient can flow between the trays 5 and the pipe work 9 for recirculation across the tiers of trays 5.

Artificial light tubes 11 extend above and generally parallel to each tray 5. The artificial light may be generated from, for example, LEDs. The light tubes 11 are clamped to, and extend downwardly from, the horizontal beams 3 of the framework. As can be seen in FIG. 2, the electrical connection 12 to each light tube 11, linking the light tube 11 to a power source remote from the section, is flexible such that the power link remains intact and connected when the height of any shelf within the section 1 is adjusted.

Figure 3:
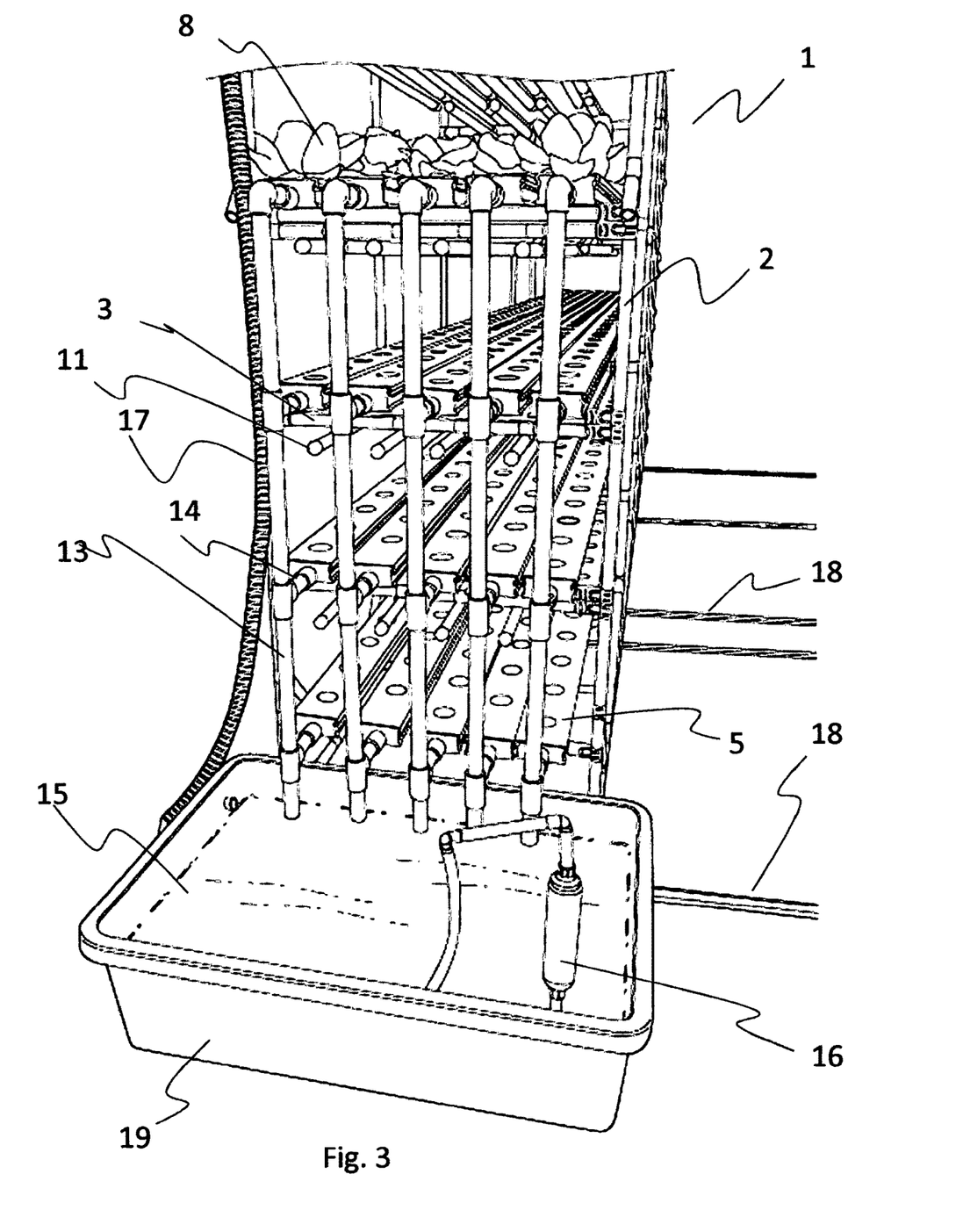
FIG. 3 is an end view of the tiered section.

The other end of the tiered section 1 is illustrated in FIG. 3. Drainage pipe work 13 is connected to this end of the section 1. The drainage pipe work 13 has a plurality of outlet pipes 14 connected in turn to the end of each tray 5.

Once assembled, the trays 5 extend across each tier of the section 1 at a slight angle such that they extend slightly downwardly towards the end of the section with the drainage pipe work 13 (i.e. the end shown in FIG. 3). Consequently excess nutrient flows along to the trays 5 into the drainage pipe work 13 to be dispensed into a drainage tank 15.

Figure 5:
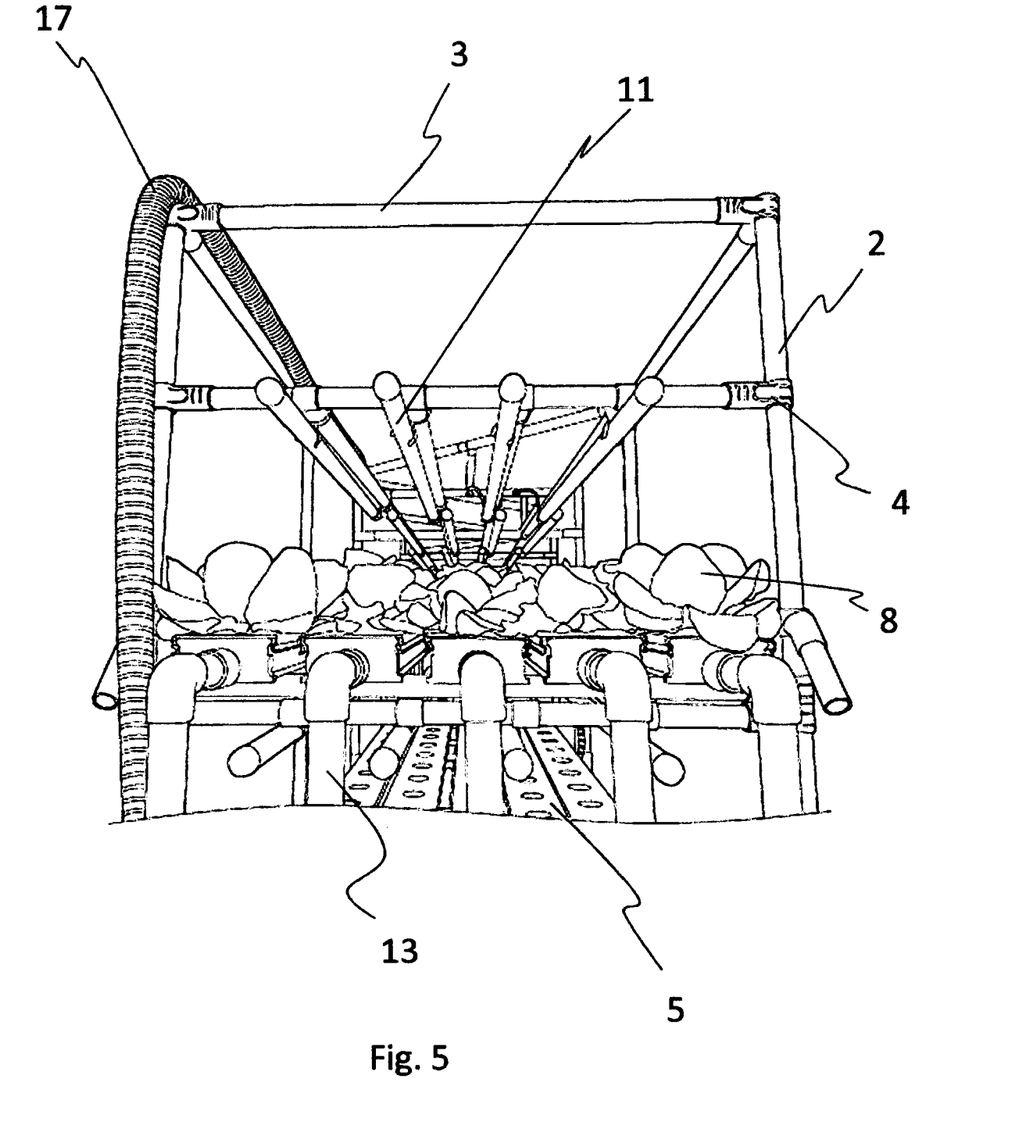
FIG. 5 is a close of the top part of the tiered section.

The drainage tank 15 includes a pump 16 to pump nutrient back through tubing 17 and back into the trays 5 for recirculation (see FIG. 5).

As can be seen in FIG. 3, the system further includes a track assembly 18 which is secured to the floor of the building in which the vertical growing system is to be installed. Only part of the track assembly 18 is shown in FIG. 3. The entire track 18 has a grid like form allowing individual sections to be moved sideways along the grid towards or away from each other.

The track 18 extends across the entire base footprint of the system. In practice a number of tiered sections 1 are located on the track assembly 18 and each section is movable along the track 18 to alter their position relative to each other. This allows a path to be opened between any two sections 1 to allow access the plants in any section 1 where necessary. When access is no longer required to the side of a particular section 1, the neighbouring section can be moved across the track assembly 18 towards and against its neighbour thereby closing the gap whilst at the same time opening up path between another section 1 and its neighbour.

The fact that each section 1 is individually movable along the track assembly 18 means that the overall footprint area of the track for the entire system (including a number of sections) only needs to incorporate a single path width thereby significantly increasing the number of the tiered sections 1, and hence the growable area within the system, within any defined location.

Figure 8:
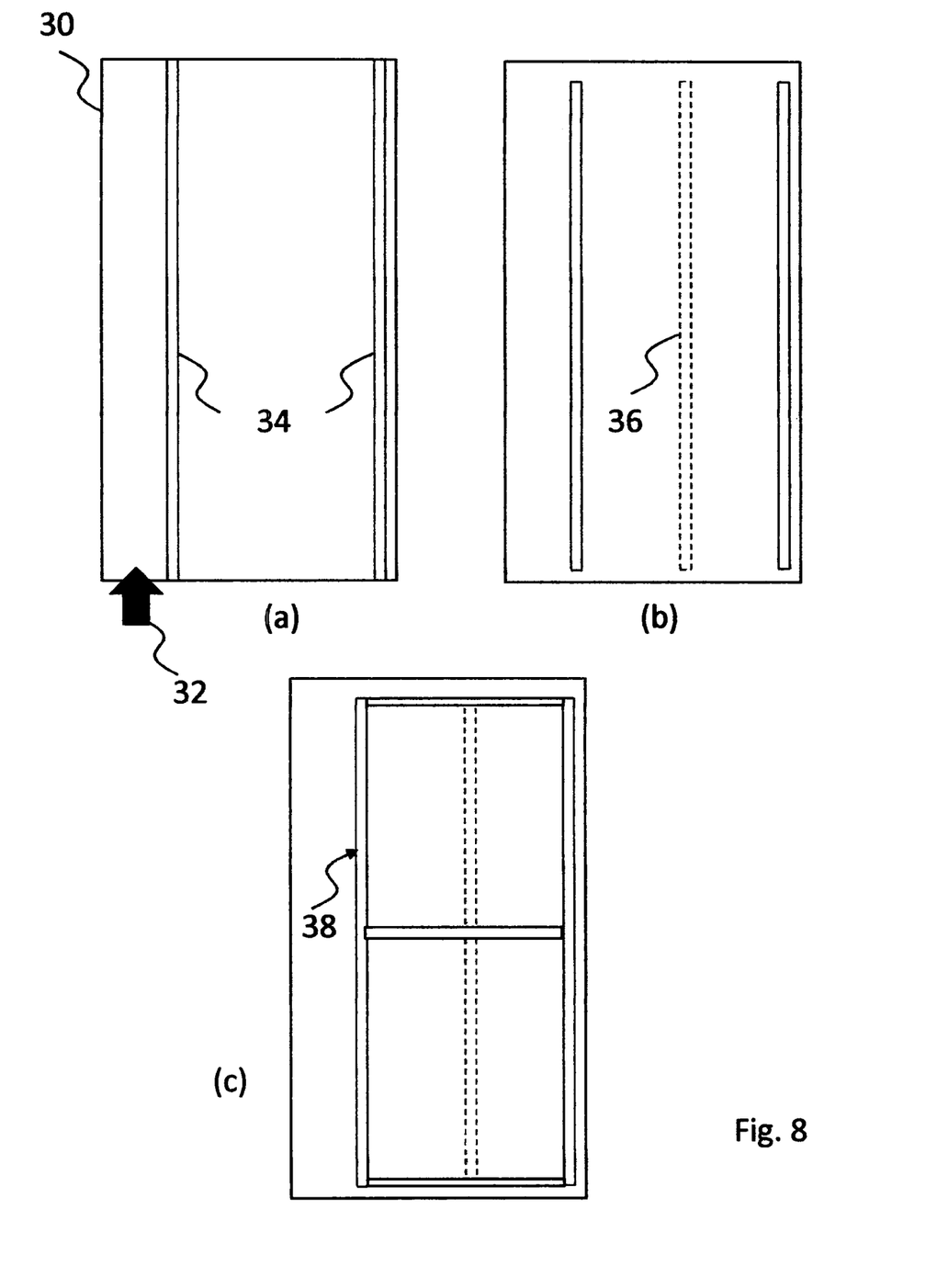
FIGS. 8(A) to (C) are schematic illustrations of tracks of the system in plan view.

Referring to FIG. 8(a), which is a plan view of a growing room 30 having entrance door 32, in some embodiments the track may comprise first and second parallel rails 34, spaced apart. Each section 1 (not shown in FIG. 8) is configured to slide or roll over the rails by respective spaced-apart sets of wheels, casters, rollers or sliders. A handle may be provided on the end of each section 1 to assist the movement. FIG. 8(b) shows that the track may comprise one or more additional rails 36. FIG. 8(c) shows a grid-like system 38 of rails, including one or more rails transverse to the longitudinal rails shown in FIGS. 8(a) and (b) for stability in terms of preventing the rails moving towards or away from each other.

The rails of the track can be of any form, e.g. cross-sectional profile.

FIGS. 9(a) and (b) show in schematic view how the overall footprint area of the system, in particular a growing room 30, can be minimised, by using the aforementioned track system. In FIG. 9(a) the space 40 represents both an access path for the adjacent section 1 (G), and also a void into which said section (G) can be moved to provide access to the next section (F). It follows that multiple sections 1 can be moved as required, and FIG. 9(b) shows how movement of multiple sections (C, D, E, F, G) along the track rails creates a new path 42 for access to the adjacent sections (B, C).

Figure 9:
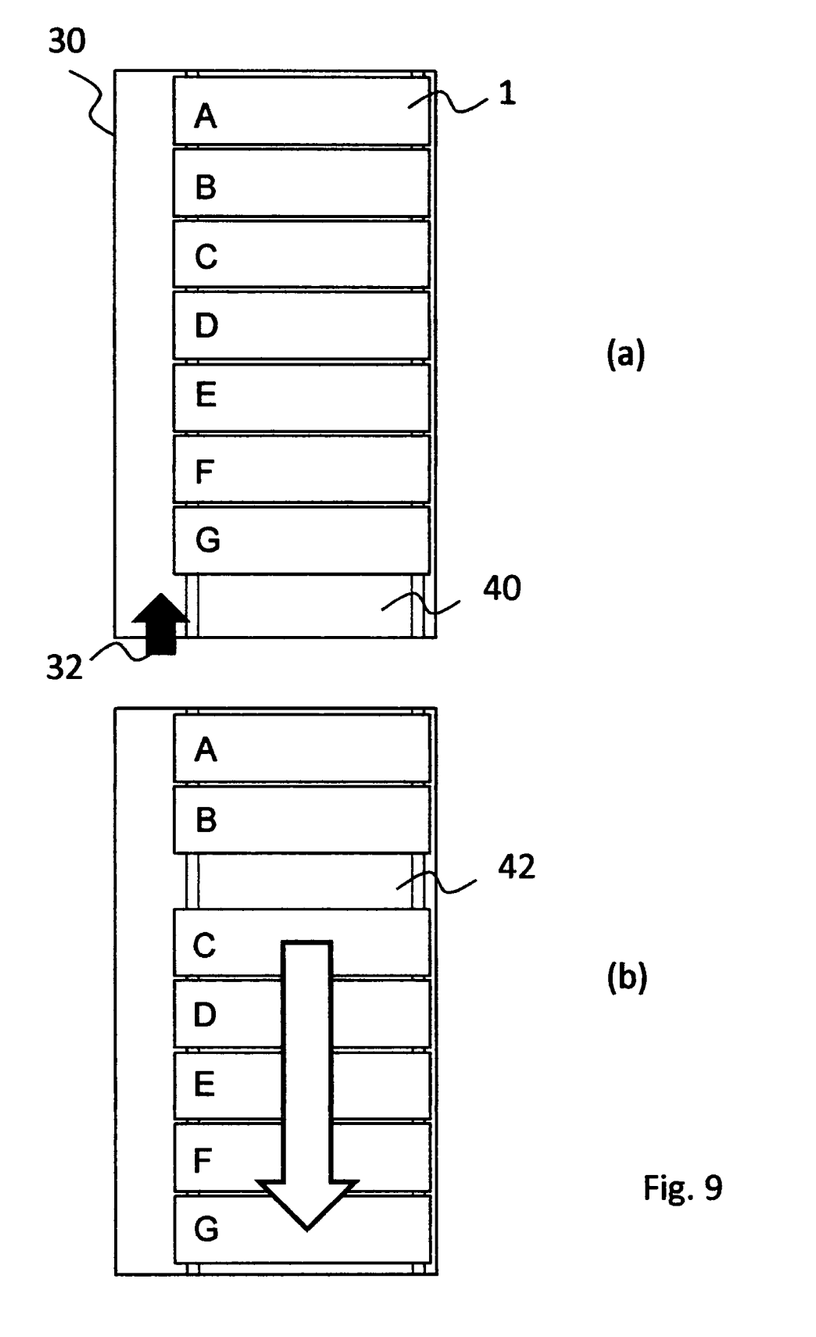

Furthermore, the fact that individual lighting and water assemblies supporting plant growth on each section 1 are carried on that section 1 itself means that the section 1 can be moved sideways along the track 18, e.g. as indicated in FIG. 9, during a plant growing cycle without requiring disconnection of the lighting or nutrient systems which would otherwise disrupt and adversely affect growth of the plants.

Moreover, each individual lighting and nutrient fluid assemblies are connected to a centralized source with flexible linkages which are able to accommodate an increase or decrease in length as the section 1 is moved towards or further away from the source. The centralised power source and water/nutrient storage (neither shown) feeding the overall system may, for example be located in within the roof structure of the building within which the system is installed and would be connected to each section 1 through individual flexible linkages extending downwardly from the source for connection to the appropriate section.

In an alternative embodiment (not shown) each section may carry its own power source, such as a battery, and a storage tank for nutrient fluid.

Figure 4:
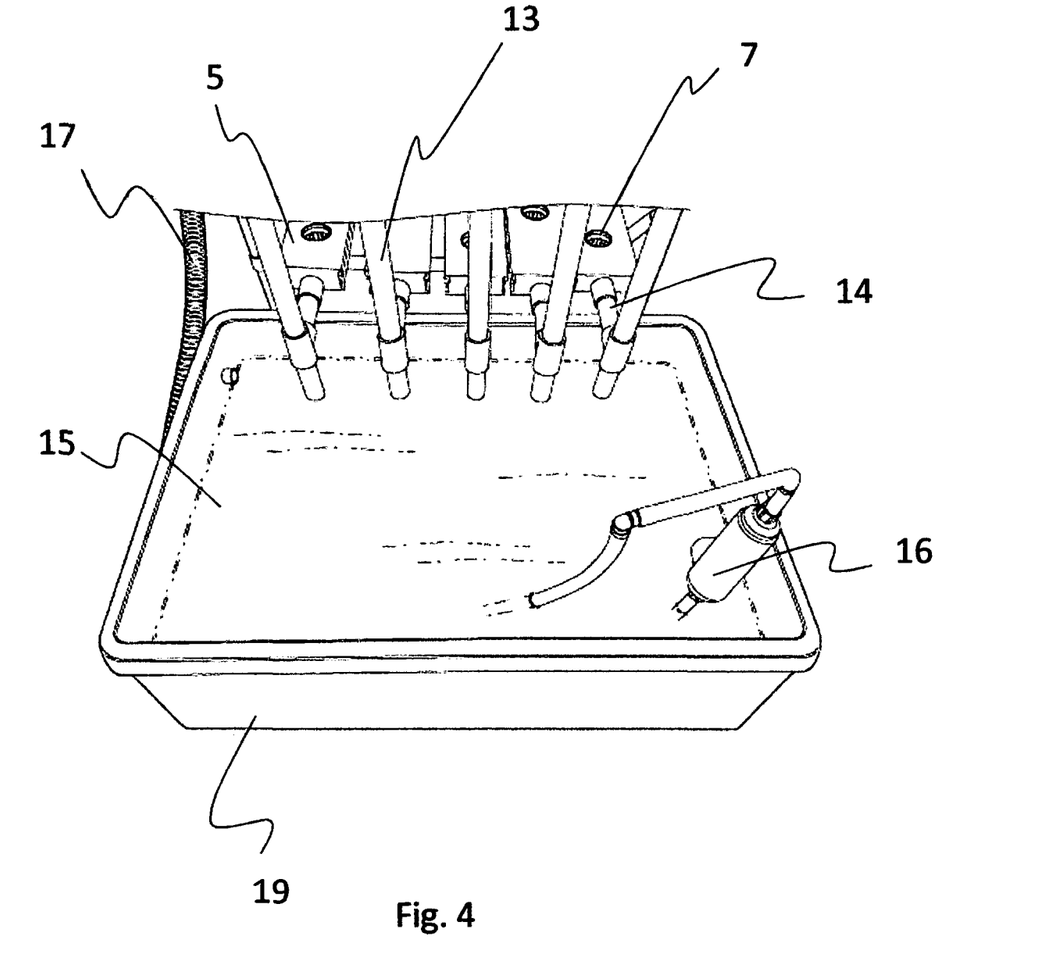
FIG. 4 is a view of a drainage tank for use with the tiered section.

Whilst the drainage tank 15 shown in FIG. 4 is shown to be width of a single section 1, it envisaged that in some embodiments the tank 15 can be elongated so that its overall length would be sufficient to accommodate sideways movement of the section 1 along the track 18 whilst retaining the ends of the drainage pipes 13 within the confines of the tank walls 19.

In an alternative embodiment the drainage tank takes the form of a single trough like structure that extends along the entire side perimeter of the track such that the drainage pipes 13 of each section remain within the confines of the walls of the trough, even when a section is moved to the extremity of the track. An example of this is described later on.

Figure 6:
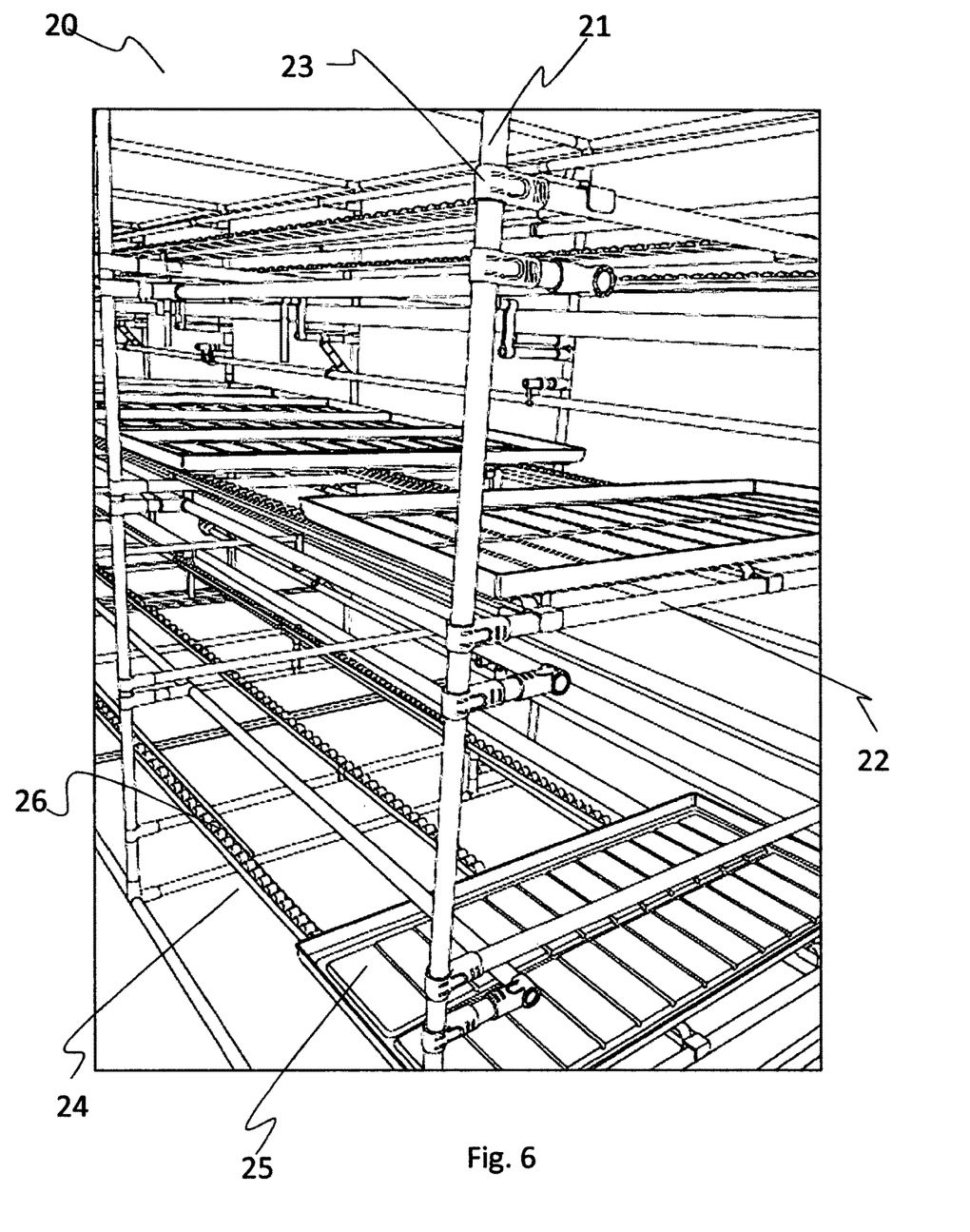
FIG. 6 is a perspective view of a vertical tiered section forming part of a vertical growing system constructed in accordance with a second embodiment present invention.
Figure 7:
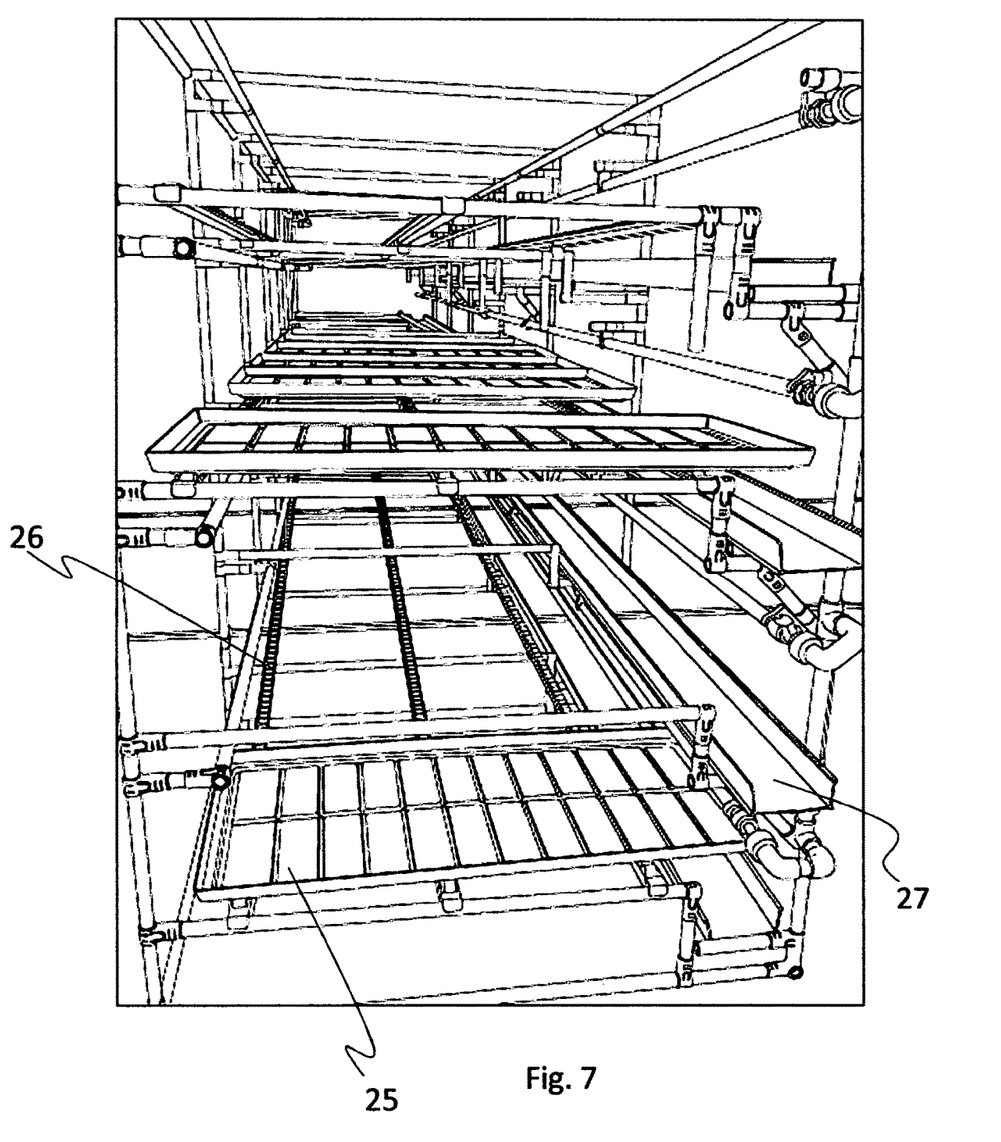
FIG. 7 is an end view of the tiered section of FIG. 6.

FIGS. 6 and 7 illustrate a different tiered section 20 for use in a vertical drainage system, this time working on the flood and drain principle. In flood and drains systems, sometimes known as ebb and flow, the entire root zone is periodically flooded with nutrient solution before it dries out. This is done with a timer on a pump from a main nutrient tank usually located directly below the flood tray. The root zone is flooded for short periods of time (between 10-15 minutes). The interval between floods will depend on plant size and medium used (stonewool or expanded clay pebbles).

As with the embodiment previously described, the overall system would include a plurality of such sections. The section 20 comprises a framework of interconnecting vertical and horizontal beams (21 and 22 respectively). The framework beams 21, 22 are constructed from aluminium or other suitable strong but lightweight material.

The horizontal beams 22 are connected to the vertical beams 21 through jointed clamps 23, the height of which can be altered to lower or heighten any tier level within the section 20.

Three elongate supporting arms 24 extending longitudinally through the section 20 at each tier level. The arms 24 provide supports for plant trays 25 which extend perpendicularly across the framework at each tier level.

Each arm 24 is provided with a roller mechanism 26 extending along the entire length of each arm 24 such that the trays 25 can be easily dragged along the longitudinal axis of the section 20 from one end to the other. The trays 26 may be manually moved along the rollers 26 or the movement may be automated.

As can be seen best in FIG. 7, drainage channels 27 extend along the length of one side of the section 20. The drainage channels 27 provide a path for flow of nutrient from the tray 25 after it has been flooded, during the drainage stage.

The end of the drainage channels extend over a drainage tank (not shown).

Like in the first described embodiment, the section 20 is one of several within the system that is secured to a floor track allowing movement of the sections 20 to open and close walkways therebetween as has previously been described.

Like with the first described embodiment, the lighting and nutrient systems for any given section 20 are carried on that section 20 such that any given section 20 can be moved along the track without the need for disconnection of the systems thereby allowing that section to be moved during the growth cycle of the plants.

The vertical tiered sections described above are designed for use in an overall system comprising a number of such sections and a floor track on which each section is mounted. The system would also include means to connect the centralised fluid and electricity supplies to the nutrient and lighting assemblies of each section.

Figure 10A:
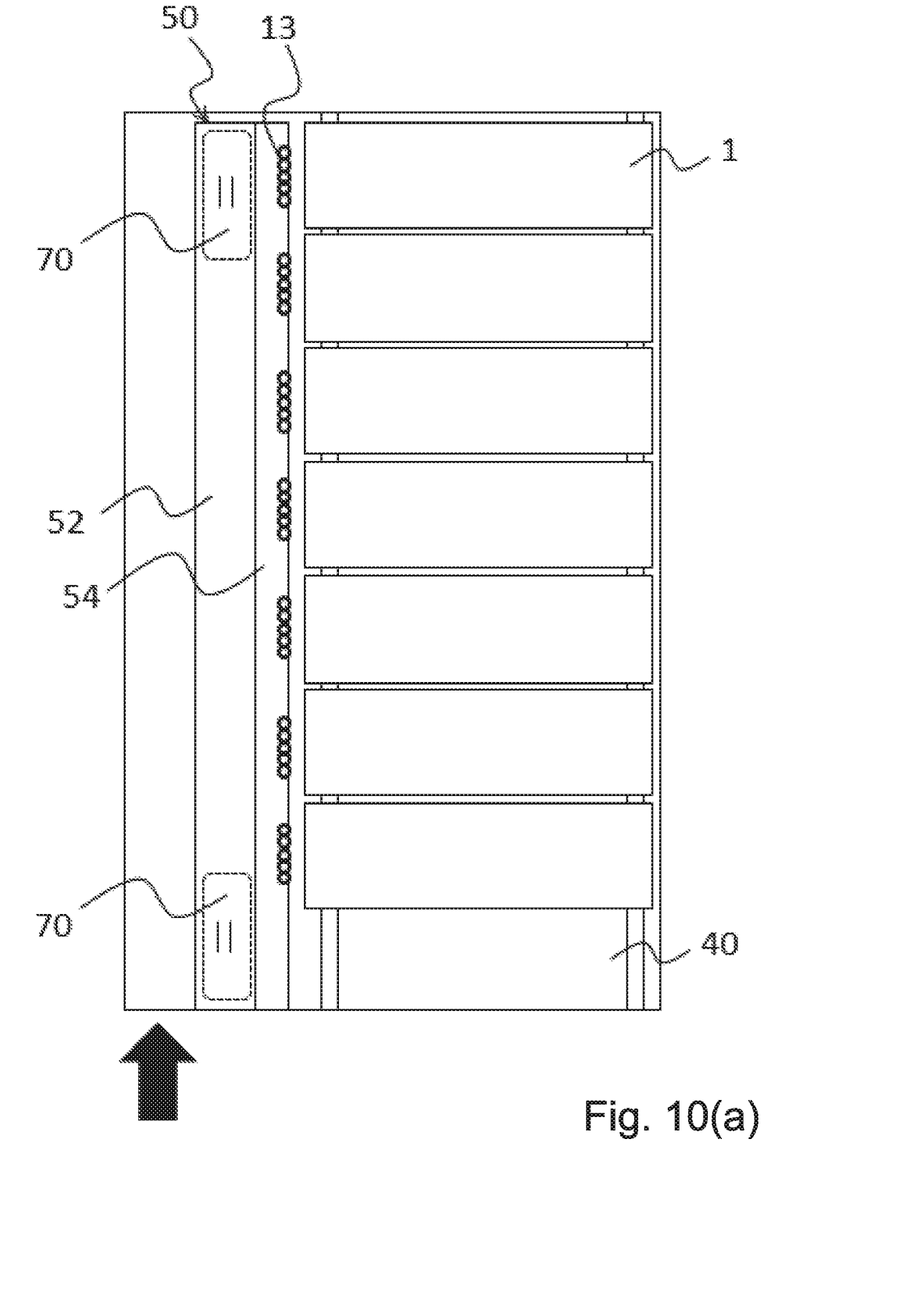
FIGS. 10(A) and (B) are schematic illustrations showing the water tank of the system.
Figure 10B:
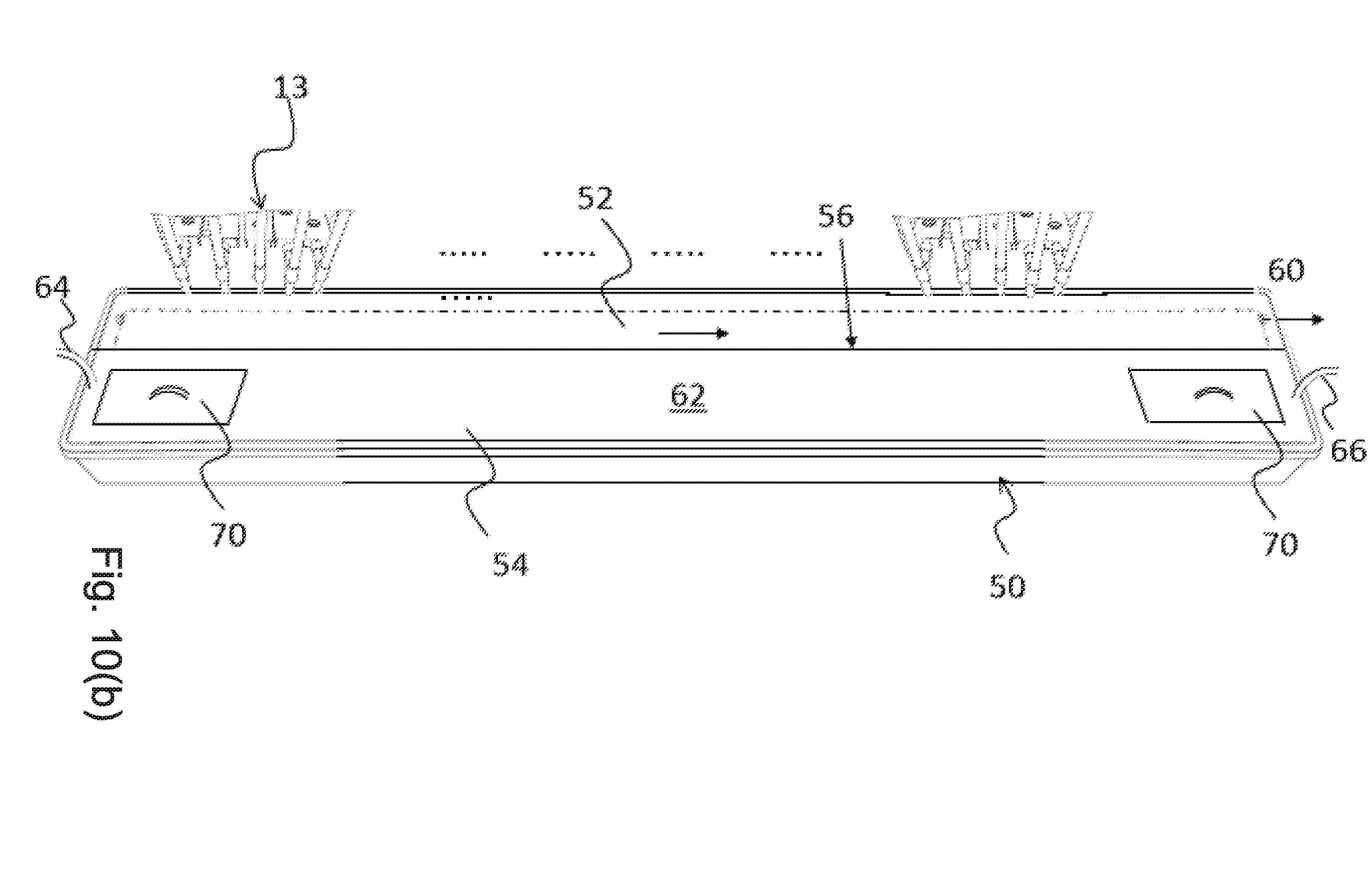

Referring to FIGS. 10(*a*) and 10(*b*), there is now described an example of the above-mentioned elongated tank. The tank 50 has a length, in this case, that extends substantially the length of side-by-side sections 1 in the growing room 30 as well as extending along the gap 40. The drainage pipes 13 of each section 1 (shown in section) are supported overhanging the tank 50 so that fluid exiting the lower ends drains into the tank, and the aforementioned sideways movement of the sections does not result in spillage. Indeed, the overhanging pipes 13 can be level with, or below, the upper perimeter wall of the tank 50 to minimise splashing.

The FIG. 10 tank 50 is also different in that it is divided into two distinct liquid-carrying parts, namely a drainage portion 52 and a fresh liquid portion 54 divided by an intermediate lengthwise wall 56. The drainage portion 52 has a sloping floor in order to urge using gravity the collected liquid towards one end where it can be removed from the tank 50, whether permanently, or for processing by a filtering/recycling system. The flow of draining liquid is indicated by the arrows to an exit aperture 60. The fresh liquid portion 54 is covered by a top wall 62; liquid is fed-in from a mains or other source through an inlet pipe 64 and exits as and when required through outlet pipe 66 which is connected to a pump that transmits the liquid to the individual sections 1. The incoming liquid may be fresh water or nutrient-containing liquid. Inspection covers 70 are provided to enable access to the fresh liquid portion 54, whether for checking levels and/or adding chemicals. Thus, both drainage and fresh liquid storage is enabled in a combined, compact and convenient unit within the growing room 30. The tank 50 is relatively lightweight, being preferably made from plastics material, although any suitable material can be used.

Figure 11:
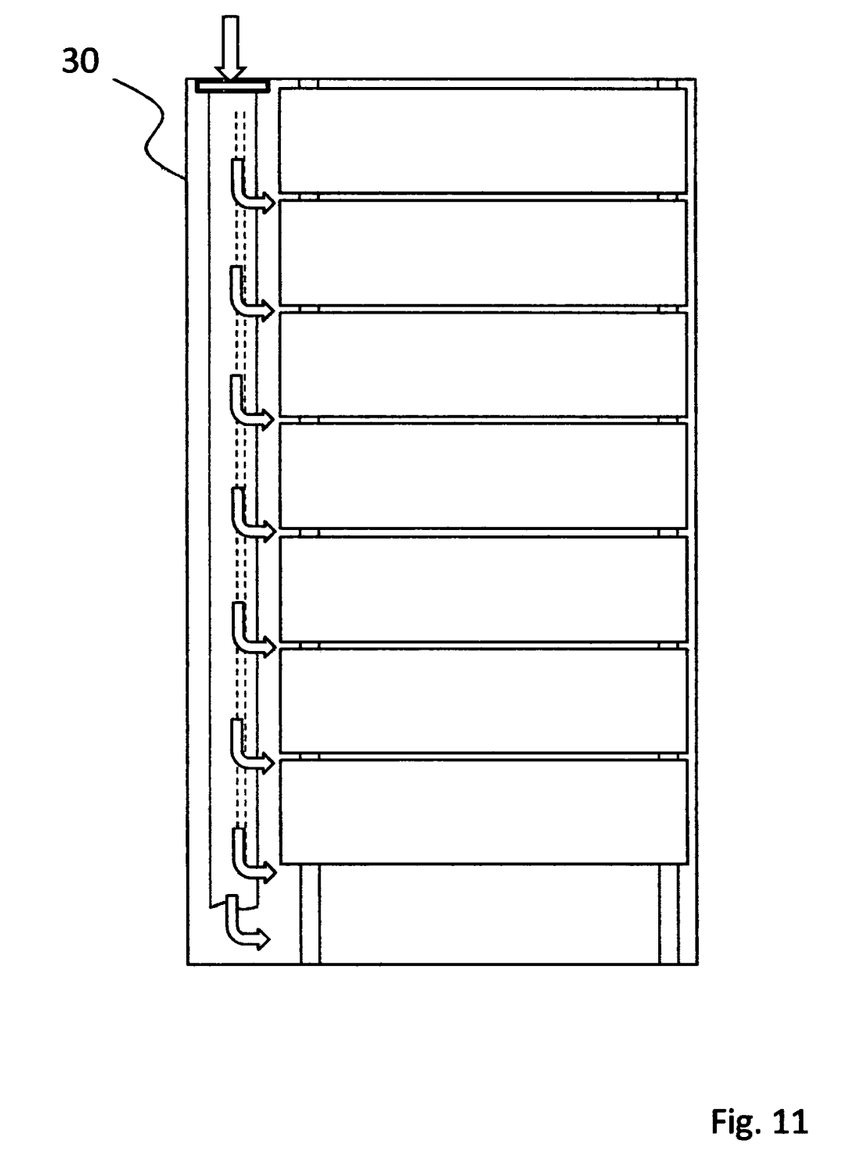
FIGS. 11 to 13 are schematic illustrations showing the use of an air duct sock within the system.
Figure 12:
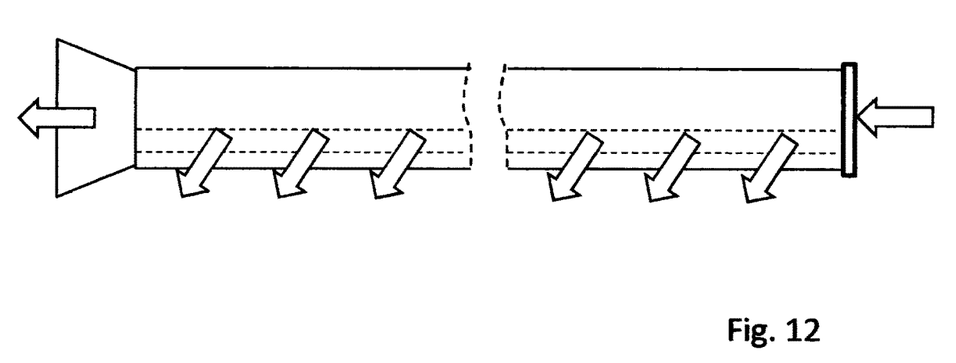
Figure 13:
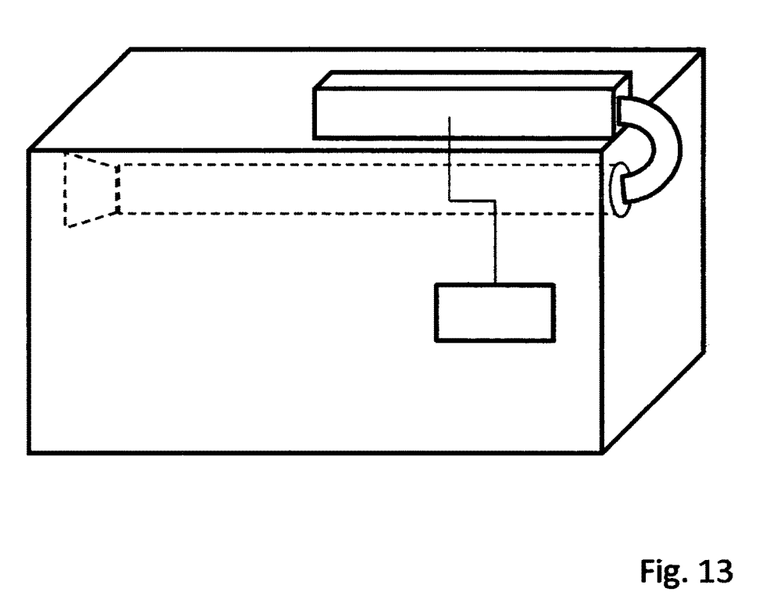

Further, in some embodiments, an air sock duct (hereafter "sock") can be provided in the growing room 30. Referring to FIG. 11, a sock 72 is shown attached to a wall mounting 74 through which air of a predetermined temperature is delivered from a low-velocity fan delivery system. The sock 72 is formed of fabric (or similar flexible) material which has a length that extends substantially the length of the room 30; it serves to evenly distribute air within the room, with micro-perforations diffusing the air and preventing draughts. FIG. 12 indicates where the sock 72 can be located in the growing room 30, e.g. above the side walkway, with the air delivery system 80 located on the external roof to maintain a compact footprint. The delivery system 80 is connected to the sock 72 by a duct 82, and controlled from a control unit 84 mounted to the side wall. As shown in FIG. 11, the perforations in the sock 72 can be arranged along one side to direct air substantially evenly towards the tiered sections, as indicated in FIG. 13.

The system would be located within a building specifically designed with strict temperature and climate controls to provide optimum conditions for plant growth. The buildings may be prefabricated units constructed on-site. The individual manoeuvrability of the tiered sections within the system allow the footprint of the unit to be only a little larger than the combined footprint of the sections with only a little extra width required to form a pathway between selected sections when necessary.

It will be appreciated that the foregoing is merely descriptive of example embodiments of this invention and that modifications can readily be made to these embodiments without departing from the true scope of the invention as set out in the appended claims.

The invention claimed is:

1. A vertical tier growing system for plants, the system comprising:
two vertically tiered shelf sections,
each section being individually secured to and movable along a floor track from first positions wherein the sections are adjacent to each other to second positions wherein a walkway is provided therebetween,
each section having located thereon means to continually provide and direct liquid and lighting to plants growing on said section during movement of each shelf section,
wherein the system further comprises:
a connection to a centralized power source, and
a connection to a centralized liquid source,
wherein the connections to the centralized power source and the centralized liquid source are connected, in use, to each individual vertically tiered shelf section through flexible links, and
wherein the flexible links are configured to allow said movement of each section along the floor track from the first positions to the second positions, and to continually provide and direct liquid and lighting to plants growing on said section during said movement of each section.

2. The system according to claim 1, wherein the floor track is formed in a grid-like formation.

3. The system according to claim 1, wherein each section comprises a framework and having an array of elongate plant trays extending longitudinally through the framework.

4. The system according to claim 3, further comprising an artificial light tube connected to the frame and extending above and along each plant tray.

5. The system according to claim 4, wherein each section includes a pipe work connected to one end of the framework to provide a channel through which liquid can flow between the pipe work and the plant trays.

6. The system according to claim 5 further comprising a drainage tank located at one end each section into or over the confines of which drainage pipe outlets extend.

7. The system according to claim 6, wherein the drainage tank includes means to pump liquid from the drainage tank back into the pipe work of the section for recirculation through the plant trays.

8. The system according to claim 6, wherein the drainage tank has an elongated form to provide a single structure in or over which the outlets of drainage pipes of neighbouring sections extend during use.

9. The system according to claim 8, wherein the drainage tank has a sloping floor for directing liquid towards an outlet at one end.

10. The system according to claim 8, wherein the structure comprises both the drainage tank and a separate liquid reservoir for storing liquid for being fed to the sections.

11. The system according to claim 10, wherein the structure comprises an elongate trough having a dividing lengthwise wall defining, on one side, the drainage tank, and, on the other side, the liquid reservoir.

12. The system according to claim 10, wherein the fluid reservoir is covered, with at least one removable inspection cover.

13. The system according to claim 1, wherein each section comprises a framework of interconnecting horizontal and vertical beams, and further comprising longitudinal support arms extending horizontally through the framework on which one or more plant trays can be supported.

14. The system according to claim 12, wherein the support arms include roller mechanism extending along the length thereof and along which the trays can be moved from one end of the section to the other.

15. The system according to claim 12, wherein the or each section includes a drainage channel extending along one side thereof to receive and drain excess liquid from the plant trays.

16. A drainage and liquid storing unit for use with a system according to claim 1, the unit comprising an elongate trough divided lengthways by an intermediate wall to provide two separate elongate reservoirs.

17. The unit according to claim 16, wherein one reservoir has a sloping floor for diverting, in use, liquid towards an outlet.

* * * * *